(12) United States Patent
Poisner

(10) Patent No.: US 6,178,528 B1
(45) Date of Patent: Jan. 23, 2001

(54) METHOD AND APPARATUS FOR REPORTING MALFUNCTIONING COMPUTER SYSTEM

(75) Inventor: David I. Poisner, Folsom, CA (US)

(73) Assignee: Intel Corporation, Santa Clara, CA (US)

( * ) Notice: Under 35 U.S.C. 154(b), the term of this patent shall be extended for 0 days.

(21) Appl. No.: 08/933,629

(22) Filed: Sep. 18, 1997

(51) Int. Cl.[7] ................................................ G06F 11/00
(52) U.S. Cl. .................................................. 714/48; 714/57
(58) Field of Search .............................. 714/48, 49, 57, 714/25, 53

(56) References Cited

U.S. PATENT DOCUMENTS

| | | | |
|---|---|---|---|
| 4,303,986 | 12/1981 | Lans | 364/900 |
| 4,594,685 | 6/1986 | Owens | 364/900 |
| 4,763,296 | 8/1988 | Gercekci | 364/900 |
| 4,809,280 | 2/1989 | Shonaka | 371/62 |
| 5,237,677 | * 8/1993 | Hirosawa et al. | 714/57 |
| 5,513,319 | * 4/1996 | Finch et al. | 714/55 |
| 5,631,847 | * 5/1997 | Kikinis | 709/207 |
| 5,809,311 | * 9/1998 | Jones | 710/104 |
| 6,038,689 | * 3/2000 | Schmidt et al. | 714/48 |

* cited by examiner

Primary Examiner—Robert W. Beausoliel, Jr.
Assistant Examiner—Christopher Revak
(74) Attorney, Agent, or Firm—Blakely, Sokoloff, Taylor & Zafman LLP

(57) ABSTRACT

When a computer system malfunction is detected, a malfunction report signal is issued to a communications device that is coupled to a communications network. After the malfunction report signal is issued, the communications device fetches a malfunction report message from a non-volatile memory device. The communications device then transmits the malfunction report message over the communications network.

20 Claims, 2 Drawing Sheets

METHOD AND APPARATUS FOR REPORTING MALFUNCTIONING COMPUTER SYSTEM

RELATED APPLICATIONS

U.S. application Ser. No. 08/933,260 entitled "Method and Apparatus for Detecting and Recovering From Computer System Malfunction" now U.S. Pat. No. 6,012,154; and U.S. Pat. No. 6,014,758 entitled "Method and Apparatus for Detecting and Reporting Failed Processor Reset" each of which is incorporated by reference herein.

BACKGROUND OF THE INVENTION

1. Field of the Invention

The present invention pertains to the field of computer systems. More particularly, this invention pertains to the field of reporting a malfunctioning computer system.

2. Background of the Related Art

For many years, computer system manufacturers, computer component manufacturers, and computer users have been concerned with detecting computer system malfunctions. There are many reasons why a computer system might malfunction, including processors failing to execute instructions, power supplies failing to provide proper voltage levels, peripherals misbehaving, etc. Computer system users become aware of these malfunctions through various means. For example, if a processor fails to execute instructions, the user observes a blank computer display screen. If a power supply fails, the computer system ceases to operate properly, if at all. In each of these cases, as well as others, the user knows that something in the computer system is malfunctioning, but can only speculate about the actual nature of the malfunction.

Computer systems are often connected to communications networks via a modem or a Local Area Network (LAN) controller. In typical prior computer systems if a malfunction occurs the computer system has no way of communicating the malfunction to the communications network. The communications network and therefore the communications network administrators remain unaware of the malfunction. At most, the communications network and the communications network administrators are aware that the communications network is unable to communicate with the malfunctioning computer system. In this situation, a technician must be dispatched to the malfunctioning computer system in order to diagnose the problem. The need for a technician to visit the malfunctioning computer system increases the total cost of ownership of the computer system. When this increase in the total cost of ownership is multiplied in order to cover the potentially large numbers of computer systems that are connected to a communications network, the increase in cost is substantial.

Some prior systems have used auxiliary dedicated microcontrollers to attempt to communicate with external diagnostic units. This solution has the major disadvantage of being costly, and again when the extra cost is multiplied in order to cover the potentially large numbers of computer systems that are connected to a communications network, the increase in cost is substantial. Therefore, a low-cost method and apparatus for reporting computer system malfunctions is desirable.

SUMMARY OF THE INVENTION

A method and apparatus for reporting a malfunctioning computer system is disclosed. After a system malfunction is detected, a malfunction report signal is issued to a communications device that is coupled to a communications network. Once the malfunction report signal is issued, the communications device transmits a malfunction report message over the communications network.

DETAILED DESCRIPTION

A method and apparatus for reporting a computer system malfunction is disclosed. In the following description, for the purposes of explanation, specific details are set forth to provide a thorough understanding of the invention. However, it will be apparent to one skilled in the art that these specific details are not required to practice the invention. In other instances, well known methods, devices, and structures are not described in particular detail in order to avoid obscuring the invention.

Overview

The invention solves the problem of reporting a computer system malfunction. In general, and in accordance with one embodiment of the invention, a computer system malfunction is detected by a malfunction detection unit. The malfunction detection unit issues a malfunction report signal to a communications device. The communications device then fetches a malfunction report message from a non-volatile memory device and transmits the malfunction report message over a communications network.

Embodiments of the Invention

Figure 1:
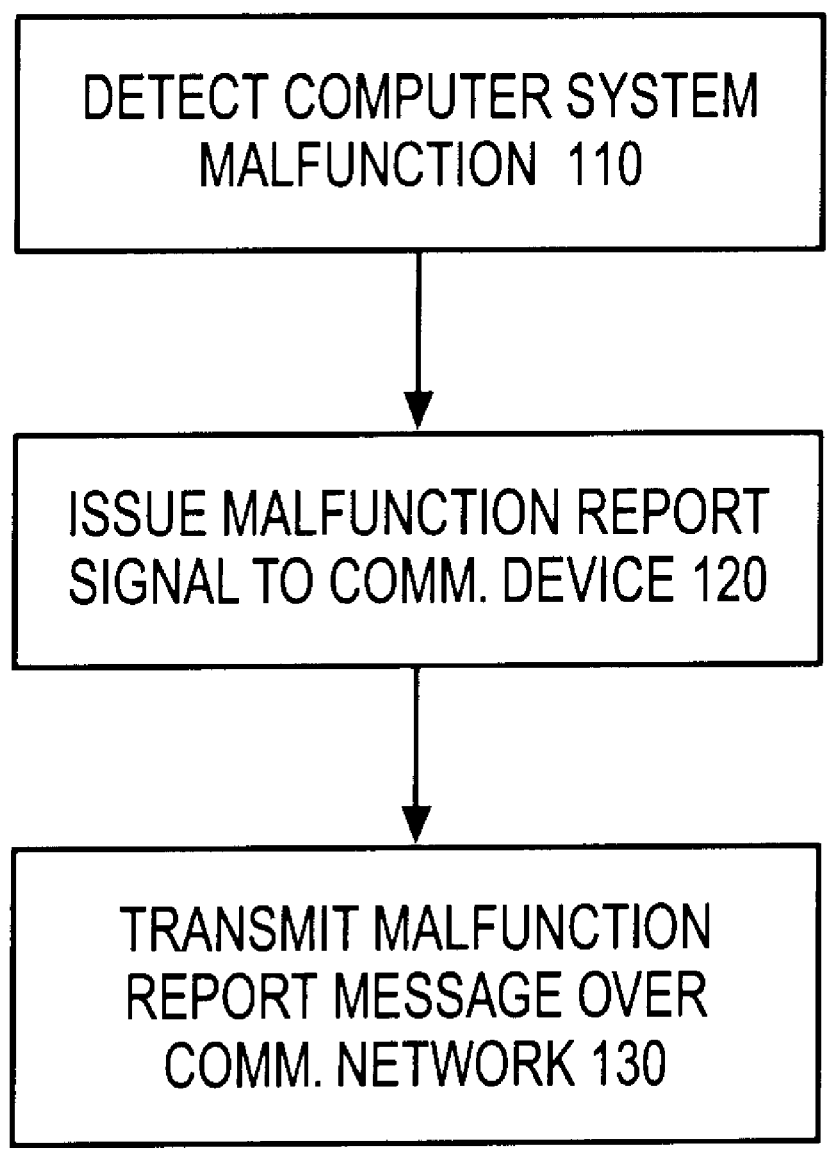
FIG. 1 shows a flow diagram of a method for reporting a computer system malfunction implemented in accordance with one embodiment of the invention.

FIG. 1 shows a flow diagram of a method for reporting a computer system malfunction implemented in accordance with one embodiment of the invention. At step 110, a computer system malfunction is detected. The types of malfunctions that may be detected are not limited to any particular types of malfunctions, but may include malfunctions such as a processor failing to execute instructions, a power supply failing to provide proper voltage levels, a cooling fan failing to operate properly, a peripheral device failing to respond to transaction requests, a communications device that is unable to communicate with other components within a computer system, etc. It is also possible to detect that a housing that encases a computer system has been opened or otherwise tampered with. For the purposes of this description, the tampering with a housing that encases a computer system is considered a malfunction.

The invention may be practiced with any method, technique, or device for detecting computer system malfunctions. One possible implementation includes an expansion bus bridge device that contains a computer system malfunction detection unit.

Once a computer system malfunction has been detected, a malfunction report signal is issued to a communications device at step 120. The malfunction report signal can be a generic signal that provides information to the communications device that a malfunction has been detected, or the malfunction report signal may include information that identifies a specific type of malfunction that has been detected. The communications device can be any device that provides communication between a computer system and a communications network, including, but not limited to, a LAN controller or a modem.

Following the issuance of the malfunction report signal to the communications device, a malfunction report message is transmitted over a communications network at step 130. The malfunction report message may be a generic message that indicates that a malfunction has been detected, or the malfunction report message may include information identifying a specific type of malfunction that has been detected. The malfunction report message may be delivered to a remote diagnostic unit that may attempt to cure the reported malfunction. The malfunction report message may also be delivered to communications network administrators who may take actions to cure the malfunction, either remotely or by visiting the malfunctioning computer system. The malfunction report signal may also be delivered to security personnel, particularly if the malfunction report message indicates that a computer system housing has been tampered with. The malfunction report message may be delivered to any device or individual that is tasked with maintaining the proper operation of the malfunctioning computer system. Step 130 may be automatically and periodically repeated until the malfunction has been cured or for a predetermined period of time.

Figure 2:
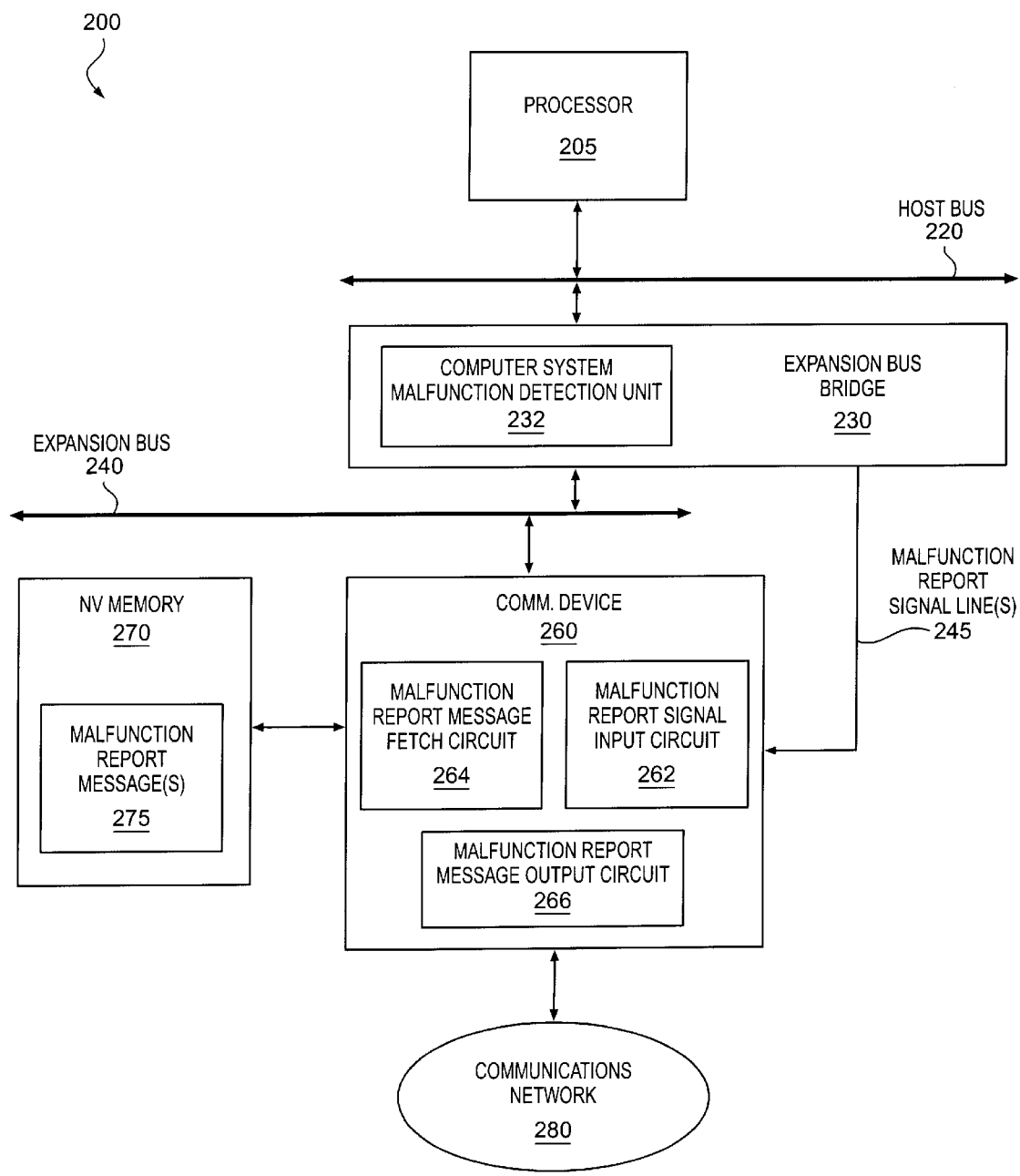
FIG. 2 depicts a block diagram of computer system implemented in accordance with one embodiment of the invention.

FIG. 2 depicts a block diagram of a computer system 200 implemented in accordance with one embodiment of the invention. The computer system 200 typically includes a host bus 220 for communicating information, such as instructions and data. The system further includes a processor 205, coupled to the host bus 220, for processing information according to programmed instructions. The processor 205 may be an 80960, 386, 486, Pentium® processor, Pentium® Pro processor, or Pentium® II processor made by Intel Corp., among others, including processors that are compatible with those listed above.

An expansion bus bridge 230 couples the host bus 220 to an expansion bus 240. The expansion bus bridge 230 includes a computer system malfunction detection unit 232. The computer system malfunction detection unit 232 is not restricted to being included in the expansion bus bridge, but may be located elsewhere in the computer system 200. Further, the computer system malfunction detection unit 232 is intended to represent a broad range of devices or functional units that can detect computer system malfunctions. Examples of computer system malfunctions that may be detected by the computer system malfunction detection unit 232 include, but are not limited to, a processor failing to execute instructions, a power supply failing to provide proper voltage levels, a cooling fan failing to operate properly, a peripheral device failing to respond to transaction requests, and a communications device that is unable to communicate with other components within a computer system.

A communications device 260 is connected to the expansion bus 240. The communications device 260 serves to couple the computer system 200 to a communications network 280. The communications device 260 may be any device that facilitates communication between a computer system and a communications network. Examples of communications devices include, but are not limited to, a LAN controller and a modem. The communications device 260 includes a malfunction report signal input circuit 262, a malfunction report message fetch circuit 264, and a malfunction report message output circuit 266. The communications device 260 is further coupled to a nonvolatile (NV) memory device 270. The NV memory device 270 has stored therein at least one malfunction report message 275.

When the computer system malfunction detection unit 232 detects a malfunction, a malfunction report signal is transmitted over at least one malfunction report signal line 245. The malfunction report signal line(s) may indicate simply that a malfunction has occurred, or may transmit information identifying a specific type of malfunction. In the case where the malfunction report signal line(s) 245 may indicate a specific type of malfunction, the information identifying the specific malfunction may be encoded on more than one malfunction report signal line 245 or, alternatively, the information identifying the specific malfunction may be transmitted in a serial fashion over a single malfunction report signal line 245. The malfunction report signal may be communicated over dedicated lines such as the malfunction report signal line(s) 245 or may also be communicated over a shared bus, such as, for example, a Peripheral Component Interconnect (PCI) bus or any other bus that allows communication between components in a computer system.

The malfunction report signal line(s) 245 is received by the malfunction report signal input circuit 262. When information indicating that a malfunction has occurred is transmitted over the malfunction report signal line(s) 245 and received by the malfunction report signal input circuit 262, the malfunction report message fetch circuit 264 retrieves the malfunction report message 275 from the NV memory device 270. The malfunction report message 275 may be a generic malfunction report message or may contain information identifying a particular type of malfunction. Further, multiple malfunction report messages 275 can be used to identify any number of types of malfunctions, and when a malfunction is reported to the communications device 260 over the malfunction report signal lines 245 an appropriate malfunction report message 275 is retrieved from the NV memory 270. The malfunction report message 275 may also contain other information including, but not limited to, the time and date of the malfunction and the physical location of the malfunctioning computer system.

Once the malfunction report message 275 has been retrieved, it is transmitted over the communications network 280 by the malfunction report message output circuit 266. The malfunction report message may be transmitted a single time, or the transmission may be repeated periodically until the malfunction has been cure or for a predetermined period of time. The communications device 240 and the NV memory 270 may optionally have back-up battery power so that if there is a power supply failure the communications device can continue to periodically repeat the transmission of the malfunction report message 275.

It will be clear to one skilled in the art that the invention can operate upon a wide range of programmable computer systems, not just the example computer system 200.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A method for reporting a malfunctioning computer system, the method comprising:

detecting a computer system malfunction, the computer system in communication with a communications network;

issuing a malfunction report signal to a communications device, the communications device coupled to the computer system and to the communications network to facilitate communication between the computer system and the communications network, the malfunction report signal to indicate a type of malfunction;

retrieving one of a plurality of predetermined malfunction report messages from a non-volatile memory device, the retrieved malfunction report message to correspond to the type of malfunction indicated by the malfunction report signal, the retrieving one of a plurality of predetermined malfunction report messages performed by the communications device; and transmitting the retrieved malfunction report message over the communications network.

2. The method of claim 1 wherein the detecting a computer system malfunction includes determining that a processor is not executing instructions.

3. The method of claim 1 wherein the detecting a computer system malfunction includes diagnosing a power supply failure.

4. The method of claim 1 wherein the detecting a computer system malfunction includes determining that a processor is unable to communicate with the communications device.

5. The method of claim 1 wherein the detecting a computer system malfunction includes determining that a computer system chassis has been opened.

6. The method of claim 1 wherein the issuing a malfunction report signal to a communications device includes issuing the malfunction report signal to a modem.

7. The method of claim 1 wherein the issuing a malfunction report signal to a communications device includes issuing the malfunction report signal to a LAN controller.

8. The method of claim 1 wherein the issuing a malfunction report signal to a communications device includes encoding information identifying a malfunction type on a plurality of malfunction report signal lines.

9. The method of claim 1 wherein the issuing a malfunction report signal to a communications device includes serially transmitting information identifying a malfunction type on a malfunction report signal line.

10. A computer system, comprising:

a malfunction detection unit;

a non-volatile memory device to store a plurality of predetermined malfunction report messages corresponding to a computer system failure, the computer system in communication with a communications network; and a communications device coupled to the computer system and the communications network to facilitate communication between the computer system and the communications network, the communications device to receive a malfunction report signal from the malfunction detection unit, the malfunction report signal to indicate a malfunction type, the communications device to retrieve one of the plurality of predetermined malfunction report messages from the non-volatile memory device, the retrieved malfunction report message to correspond to the indicated malfunction type, and the communications device to transmit the retrieved malfunction report message over the communications network.

11. The computer system of claim 10 wherein the communications device consists of a LAN controller.

12. The computer system of claim 10 wherein the communications device consists of a modem.

13. The computer system of claim 10 wherein the communications device is coupled to a battery that provides back-up power to the communications device.

14. The computer system of claim 10 wherein the malfunction report signal includes information encoded on a plurality of malfunction report signal lines, the information to indicate the malfunction type.

15. The computer system of claim 10 wherein the malfunction report signal includes information transmitted serially on a malfunction report signal line, the information to indicate the malfunction type.

16. A communications device, comprising:

a malfunction report signal input circuit to receive, from the computer system, a malfunction report signal corresponding to a computer system malfunction, the communications device is to be coupled to the computer system to facilitate communications with a communications network, and the malfunction report signal indicating a malfunction type of the computer system;

a malfunction report message fetch circuit to fetch one of a plurality of predetermined malfunction report messages stored in a non-volatile memory device, the fetched malfunction report message corresponding to the malfunction type indicated by the malfunction report signal; and a malfunction report message output circuit to output the fetched malfunction report message for transmission over a communications network.

17. A machine-readable medium having stored thereon data representing sequences of instructions, the sequences of instructions which, when executed by a processor, cause the processor to:

detect a computer system malfunction, the computer system in communication with a communications network;

issue a malfunction report signal to a communications device, the communications device coupled to the computer system and to the communications network to facilitate communication between the computer system and the communications network, the malfunction report signal to indicate a type of malfunction;

retrieve one of a plurality of predetermined malfunction report messages from a non-volatile memory device, the retrieved malfunction report message to correspond to the type of malfunction indicated by the malfunction report signal, the retrieving one of a plurality of predetermined malfunction report messages performed by the communications device; and transmit the retrieved malfunction report message over the communications network.

18. The method of claim 17 wherein the issuing a malfunction report signal to a communications device includes encoding information identifying a malfunction type on a plurality of malfunction report signal lines.

19. A method for reporting a malfunctioning computer system, the method comprising:

detecting a computer system malfunction, the computer system in communication with a communications network;

issuing a malfunction report signal to a communications device, the communications device coupled to the computer system and to the communications network to facilitate communication between the computer system and the communications network, the malfunction report signal to indicate a type of malfunction;

retrieving one of a plurality of predetermined malfunction report messages from a non-volatile memory device, the retrieved malfunction report message corresponding to the type of malfunction indicated by the malfunction report signal, the retrieving one of a plurality of predetermined malfunction report messages performed by the communications device; and transmitting the retrieved malfunction report message over the communications network to a trouble-shooting entity.

20. A method for reporting a malfunctioning computer system, the method comprising:

detecting a computer system malfunction, the computer system in communication with a communications network;

issuing a malfunction report signal to a LAN controller, the LAN controller coupled to the computer system and to the communications network to facilitate communication between the computer system and the communications network, the malfunction report signal to indicate a type of malfunction;

retrieving one of a plurality of predetermined malfunction report messages from a non-volatile memory device, the retrieved malfunction report message corresponding to the type of malfunction indicated by the malfunction report signal, the retrieving one of a plurality of predetermined malfunction report messages performed by the LAN controller; and transmitting the retrieved malfunction report message over the communications network.

* * * * *